United States Patent
Gao et al.

(10) Patent No.: US 8,468,305 B2
(45) Date of Patent: Jun. 18, 2013

(54) DATA PROCESSING METHOD FOR REMOVABLE STORAGE MEDIUM AND DATA PROCESSING DEVICE

(75) Inventors: Jie Gao, Kawasaki (JP); Toshihiro Sonoda, Kawasaki (JP); Shigehiro Idani, Kawasaki (JP); Hiroshi Tsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 13/047,506

(22) Filed: Mar. 14, 2011

(65) Prior Publication Data

US 2011/0231607 A1   Sep. 22, 2011

(30) Foreign Application Priority Data

Mar. 19, 2010   (JP) ................. 2010-064164

(51) Int. Cl.
*G06F 12/16* (2006.01)
*G06F 21/00* (2006.01)
(52) U.S. Cl.
USPC .............. 711/115; 711/103; 711/163; 726/26
(58) Field of Classification Search
None
See application file for complete search history.

(56) References Cited

U.S. PATENT DOCUMENTS

| | | | | |
|---|---|---|---|---|
| 6,564,307 B1* | 5/2003 | Micka et al. | | 711/156 |
| 2003/0085289 A1* | 5/2003 | Kaneko | | 235/492 |
| 2004/0243779 A1* | 12/2004 | Okaue et al. | | 711/166 |
| 2006/0101190 A1 | 5/2006 | McLean | | |
| 2006/0236409 A1 | 10/2006 | Kuehnel et al. | | |
| 2007/0028063 A1* | 2/2007 | Hars et al. | | 711/162 |
| 2007/0168286 A1* | 7/2007 | Nishioka et al. | | 705/51 |
| 2008/0098172 A1* | 4/2008 | Tsang et al. | | 711/115 |
| 2008/0244737 A1* | 10/2008 | Hayasaka | | 726/21 |
| 2009/0025091 A1* | 1/2009 | Koike et al. | | 726/28 |
| 2009/0106845 A1 | 4/2009 | Li | | |
| 2009/0182965 A1 | 7/2009 | Norman | | |
| 2009/0268905 A1* | 10/2009 | Matsushima et al. | | 380/200 |
| 2010/0011180 A1* | 1/2010 | Yashima | | 711/162 |
| 2010/0153708 A1* | 6/2010 | Malka | | 713/155 |
| 2010/0251390 A1* | 9/2010 | Shimura et al. | | 726/30 |
| 2011/0055359 A1* | 3/2011 | Muraki | | 709/219 |
| 2011/0179495 A1* | 7/2011 | Maetz et al. | | 726/26 |

FOREIGN PATENT DOCUMENTS

| | | |
|---|---|---|
| JP | 2006-195629 | 7/2006 |
| JP | 2008-140127 | 6/2008 |
| JP | 2009-163494 | 7/2009 |

OTHER PUBLICATIONS

United Kingdom Search Report issued Jun. 30, 2011 in corresponding United Kingdom Patent Application GB1104364.3.

* cited by examiner

*Primary Examiner* — Kaushikkumar Patel
(74) *Attorney, Agent, or Firm* — Staas & Halsey LLP

(57) ABSTRACT

A computer-implemented method that enables an operation relative to a removable storage medium connected with a computer includes, obtaining an erasing flag to be set to the removable storage medium on the basis of a predetermined rule when the removable storage medium being connected, obtaining a connection time when the removable storage medium is connected, and identifying whether a program being activated on the computer is an erasing program for erasing data stored in the removable storage medium. The computer-implemented method enables concealing, upon the erasing flag is being on and the program being activated being other than the erasing program, data to be erased classified on the basis of the connection time included in the data stored in the removable storage medium.

12 Claims, 9 Drawing Sheets

FIG. 7

| FILE NAME | SIZE | CREATION DATE AND TIME | LAST UPDATE DATE AND TIME | LAST ACCESS DATE AND TIME | ... |
|---|---|---|---|---|---|
| a.txt | 200Kb | 2009/11/1 11:00:01 | 2009/11/2 13:00:25 | 2009/11/3 15:30:21 | ... |
| b.doc | 2.3MB | 2009/11/6 11:00:01 | 2009/11/7 07:00:25 | 2009/11/8 12:30:21 | ... |
| c.xml | 1.3MB | 2009/11/10 13:00:01 | 2009/11/12 18:00:25 | 2009/11/13 15:30:21 | ... |
| d.ppt | 100Kb | 2009/11/20 09:00:28 | 2009/11/20 09:10:09 | 2009/11/20 09:11:56 | ... |

US 8,468,305 B2

DATA PROCESSING METHOD FOR REMOVABLE STORAGE MEDIUM AND DATA PROCESSING DEVICE

CROSS-REFERENCE TO RELATED APPLICATION

This application is based upon and claims the benefit of priority of the prior Japanese Patent Application No. 2010-64164, filed on Mar. 19, 2010, the entire contents of which are incorporated herein by reference.

FIELD

The embodiments discussed herein are related to a data processing method for a removable storage medium and a data processing device.

BACKGROUND

A recent trend of a removable storage medium such as a Universal Serial Bus (shortened as USB hereafter) memory is that technology for erasing stored data upon the medium being connected to a Personal Computer (shortened as PC hereafter) is employed so as to prevent information leakage in case of loss or theft of the medium. Such kind of USB memory technology includes information of what activates a data erasing program in the USB memory in case of connection with a PC and automatically erases temporarily accessible data (e.g., refer to Japanese Laid-open Patent Publication No. 2006-195629). Further, it includes information of what deletes a file which has expired by means of a data erasing program (e.g., refer to Japanese Laid-open Patent Publication No. 2008-140127).

SUMMARY

According to an embodiment, a computer-implemented method of a removable storage medium connected to a computer includes, obtaining an erasing flag to be set to the removable storage medium from the removable storage medium based on a predetermined rule upon determining that the removable storage medium is connected, obtaining a connection time when the removable storage medium is connected, identifying whether a program being activated on the computer is an erasing program for erasing data stored in the removable storage medium, and concealing data to be erased classified based on the connection time included in the data stored in the removable storage medium upon determining that the erasing flag is on and the program activated is other than the erasing program.

Objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 illustrates a directory to be returned to a File System (FS) filter upon a program requesting a directory of a USB memory through an FS;

DETAILED DESCRIPTION OF THE EMBODIMENTS

Figure 1:
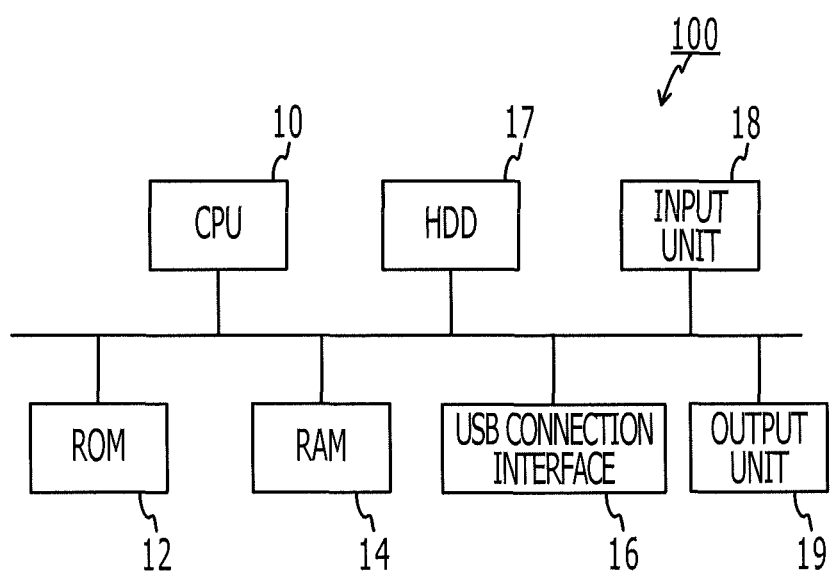
FIG. 1 illustrates a hardware structure of a PC of an embodiment.

Reference will now be made in detail to the embodiments, examples of which are illustrated in the accompanying drawings, wherein like reference numerals refer to the like elements throughout. The embodiments are described below to explain the present invention by referring to the figures.

An embodiment of a data processing method for a removable storage medium and a data processing device is explained in detail with reference to FIGS. 1-9B, hereafter.

FIG. 1 illustrates a PC 100 as a data processing device. The PC 100 has a CPU 10, a ROM 12, a RAM 14, a hard disk drive (HDD) 17, an input unit 18, an output unit 19 and a USB connection interface 16 which are connected to one another through a bus. The input unit 18 can be a keyboard, a mouse, etc., and the output unit 19 can be a display such as a CRT or an LCD, a printer, etc. The PC 100 exchanges data to and from a USB memory being connected thereto through the USB connection interface 16. The HDD 17 stores data including a wide-use program therein. The CPU 10 runs the program stored in the HDD 17, so that the PC 100 can implement various functions. While a particular example of a removable storage medium is used for illustration, the present invention is not limited to using a USB memory. Instead, any type of storage capable of storing data and/or configured to enable a storage operation including in conjunction with the PC 100 may be used.

Figure 2:
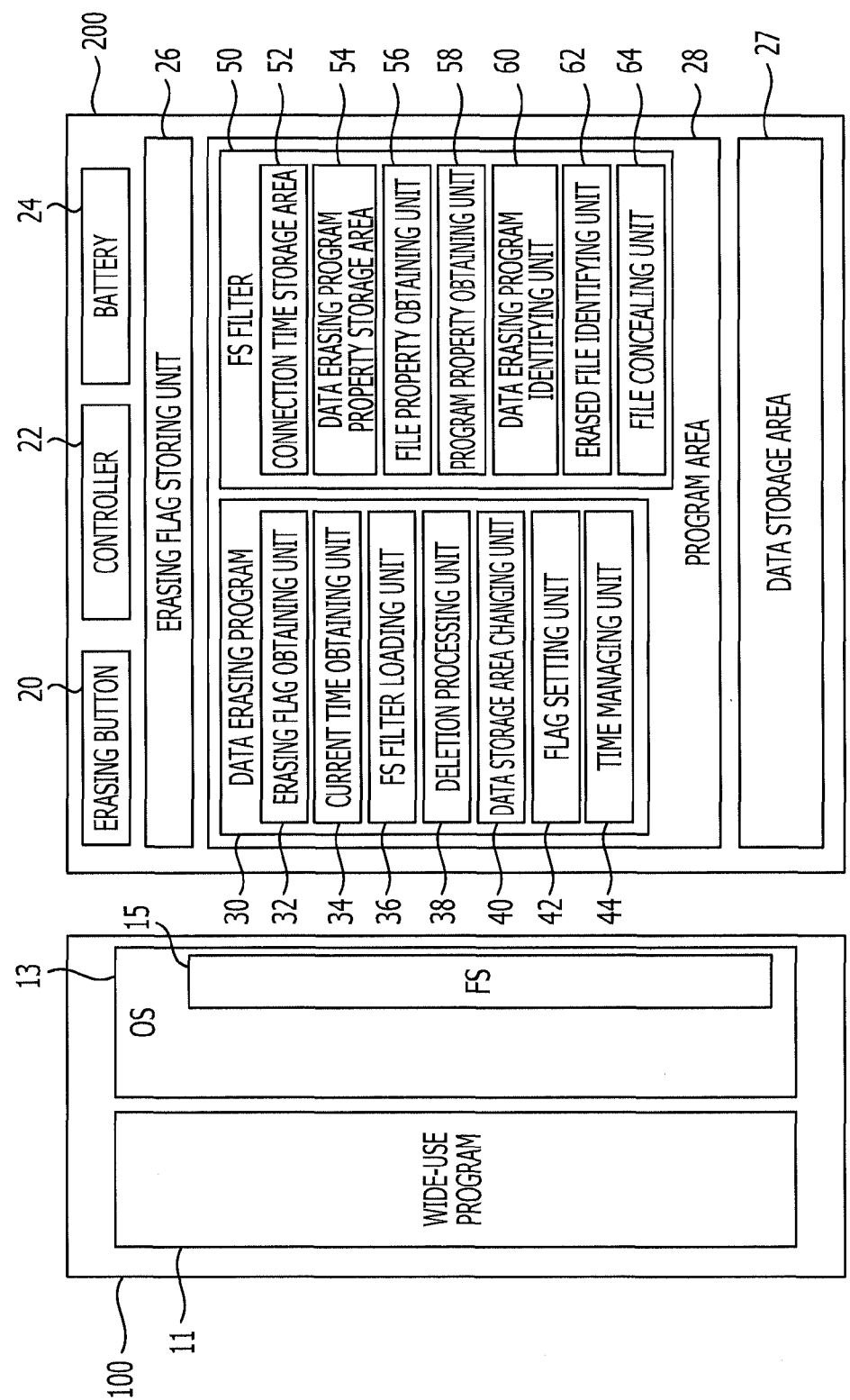
FIG. 2 is a block diagram for illustrating a functional structure of a PC and a USB memory.

FIG. 2 illustrates an embodiment of a system according to the invention. As illustrated in FIG. 2, e.g., an Operating System (shortened as OS, hereafter) 13 and a File System (shortened as FS, hereafter) 15 work so that the data exchange between the PC 100 and the USB memory 200, etc. is controlled.

As illustrated in FIG. 2, the USB memory 200 has an erasing button 20, a controller 22, a battery 24, an erasing flag storing unit 26, a data storage area 27 and a program area 28.

The erasing button 20 is a button to be turned on or otherwise activated by a user who wants to erase data in the USB memory 200. The controller 22 supervises processes carried out in the USB memory 200. The battery 24 supplies the controller 22 with power when the erasing button 20 is pushed. The erasing flag storing unit 26 stores therein values "0" and "1" as an erasing flag before and after the erasing button 20 is pushed, respectively. The data storage area 27 stores therein a user-created file, etc. The program area 28 referred to as an imaginary CD-ROM drive for example, stores therein a data erasing program 30 and an FS filter 50.

If the USB memory 200 is connected to the USB connection interface 16 of the PC 100, the data erasing program 30 is automatically loaded on the PC 100 side, and works to enable the CPU 10 of the PC 100 as an erasing flag obtaining unit 32, a current time obtaining unit 34 being a connection time obtaining unit, an FS filter loading unit 36, a deletion processing unit 38 being an erasing unit, a data storage area changing unit 40, a flag setting unit 42 and a time managing unit 44.

If the USB memory 200 is connected to the USB connection interface 16, the FS filter 50 works on the OS 13 as a connection time storage area 52, a data erasing program property storage area 54, a file property obtaining unit 56, a program property obtaining unit 58, a data erasing program identifying unit 60 being an identifying unit, an erased file identifying unit 62 and a file concealing unit 64 being a data concealing unit.

Incidentally, each of portions of the data erasing program 30 and the FS filter 50 are described below in detail. All or some of the operations with respect to the data erasing program 30 and the FS filter 50 of the USB memory 200 may be implemented via software or hardware. For example, a hardware device, system, etc. may be provided as the erasing flag obtaining unit 32, the current time obtaining unit 34, etc.

Figure 3:
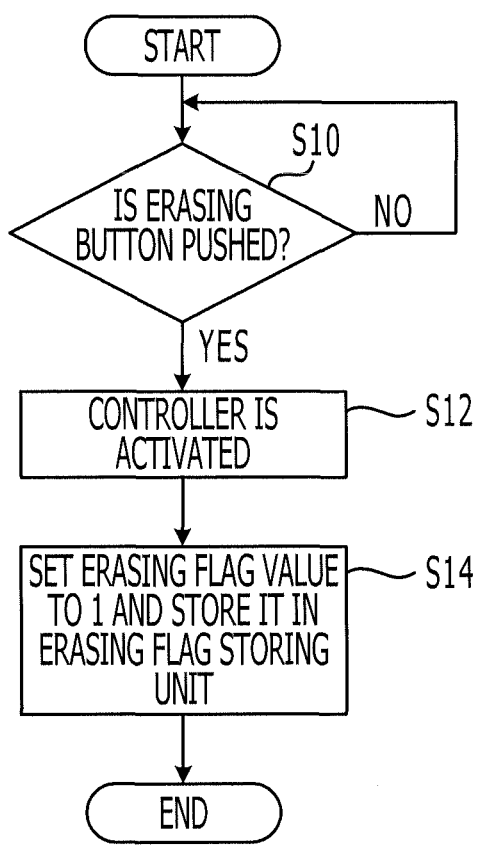
FIG. 3 is a flowchart for illustrating a process carried out in a USB memory before the USB memory is connected to a PC.

Then, processes carried out in the PC 100 and the USB memory 200 are explained in detail with reference to FIGS. 3-8. FIG. 3 is a flowchart for illustrating a process carried out in the USB memory 200 before the USB memory 200 is connected to the PC 100. If a user pushes the erasing button 20 at S10, as illustrated in FIG. 3, the controller 22 is activated at S12. An operation in S10 of the process may be enabled in response to any trigger that requests or causes data to be erased and thus is not limited to a user pushing a button. The activation is done, for example, by the use of power supplied by the battery 24 contained in the USB memory 200. Then, the controller 22 turns the erasing flag on (changes its value from "0" to "1") and stores the erasing flag in the erasing flag storing unit 26 at S14. If the erasing flag setting is completed as described above, the process illustrated in FIG. 3 finishes.

Figure 4:
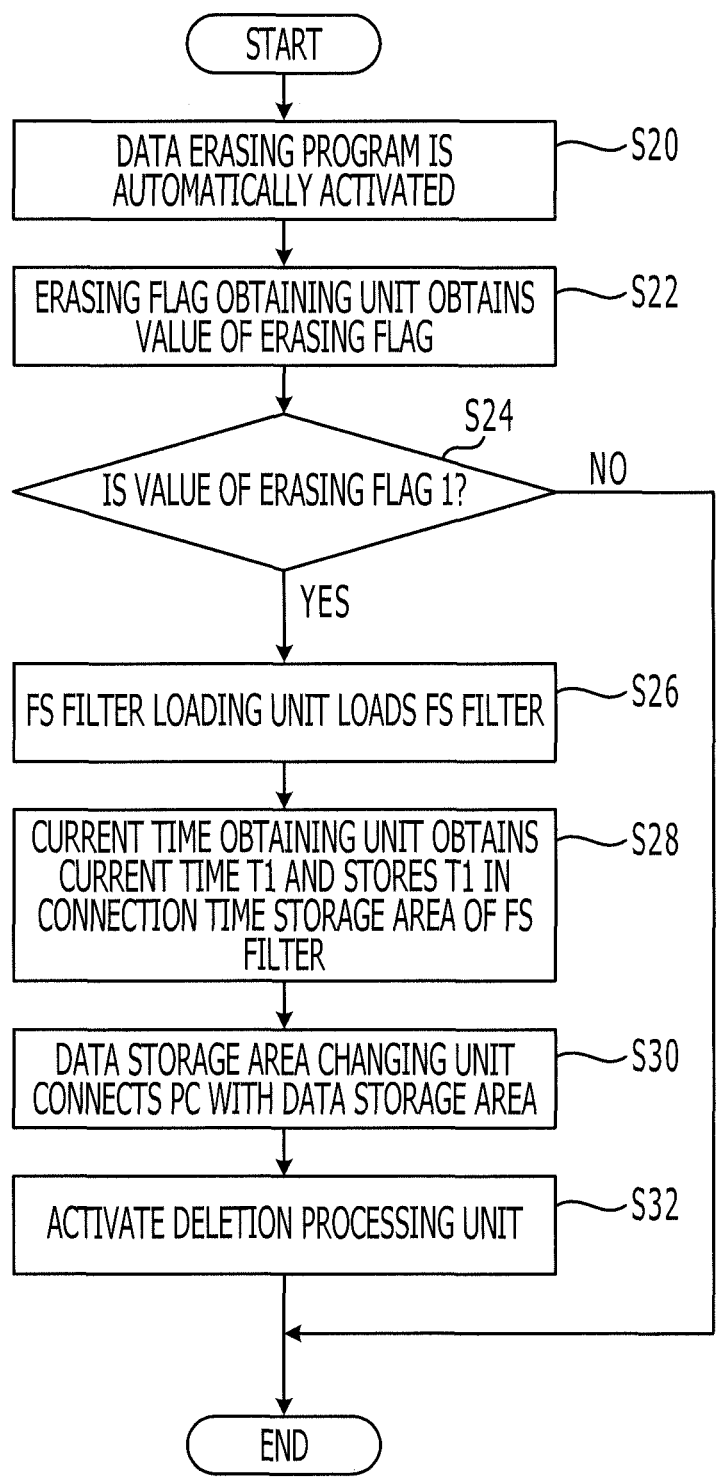
FIG. 4 is a flowchart for illustrating a process carried out after a USB memory is connected to a PC.

FIG. 4 is a flowchart for illustrating a process carried out after the USB memory 200 is connected to the PC 100. If the USB memory 200 is connected to the USB connection interface 16 of the PC 100, as illustrated in FIG. 4, the data erasing program 30 is automatically activated by the CPU 10 of the PC 100 at S20 by means of an auto-run function of the program area 28. Incidentally, if the auto-run function of the program area 28 has been made ineffective, the data erasing program 30 waits for the user to run the data erasing program 30 at S20. Incidentally, as the data storage area 27 is not connected with the PC 100 side just after this S20 finishes, the user is being unable to access the data storage area 27 from the PC 100.

Then, the erasing flag obtaining unit 32 of the data erasing program 30 obtains a value of the erasing flag (0 or 1) with reference to the erasing flag storing unit 26 at S22.

Then, the erasing flag obtaining unit 32 identifies whether the value of the erasing flag is "1" or not at S24. If the identification is negative here, it is unnecessary to erase the data as the erasing button 20 is not pushed by the user. Thus, the entire process illustrated in FIG. 4 finishes and the PC 100 is supposed to carry out an ordinary process by means of the wide-use program 11. Meanwhile, if the identification is positive at S24, it is necessary to erase the data in the data storage area 27 as the erasing button 20 is pushed by the user. In this case, shift to S26.

Figure 5:
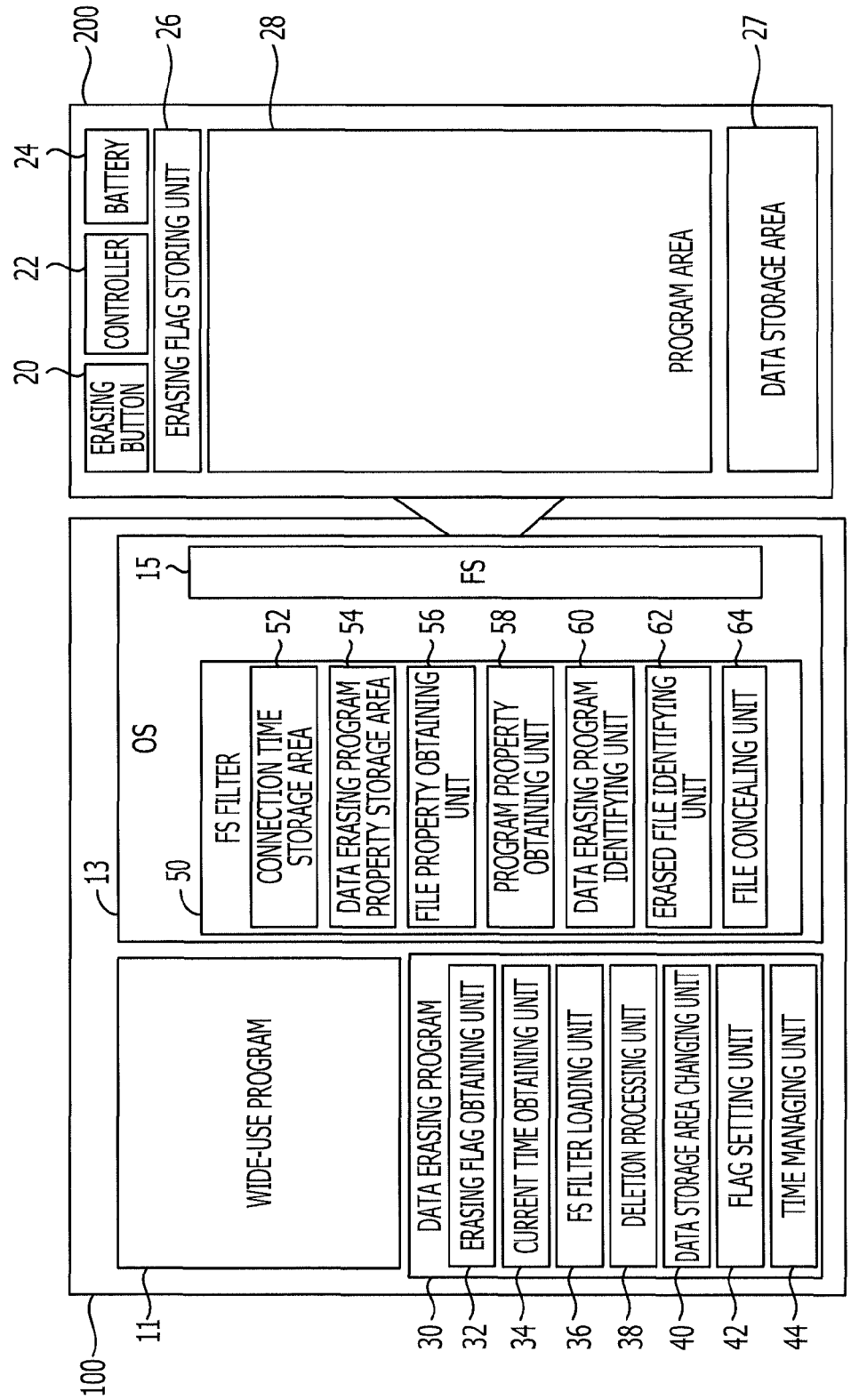
FIG. 5 schematically illustrates state(s) of a PC and a USB memory including when the process illustrated in FIG. 4 is finished.

The FS filter loading unit 36 loads the FS filter 50 from the program area 28 of the USB memory 200 into the PC 100 (OS 13) at S26. Then, the current time obtaining unit 34 obtains current time (supposed to be T1) and stores T1 in the connection time storage area 52 of the FS filter 50 at S28. Then, the data storage area changing unit 40 connects the PC 100 with the data storage area 27 at S30. That is, the user is enabled to access the data storage area 27 from the PC 100 owing to S30. Then, the deletion processing unit 38 is activated at S32 and the entire process illustrated in FIG. 4 finishes. Incidentally, FIG. 5 schematically illustrates states of the PC 100 and the USB memory 200 at a point of time when the process illustrated in FIG. 4 is finished. As illustrated in FIG. 5, the data erasing program 30 and the FS filter 50 are loaded on the PC 100 side and being activated. The time related information is stored in the connection time storage area 52 when the USB memory 200 is put in or otherwise communicatively coupled with the PC 100. The properties of the data erasing program (e.g., a program name) are stored in the data erasing program property storage area 54. Data, etc. exchanged between the wide-use program 11 of the PC 100 and the USB memory 200 is sure to pass the FS filter 50. Further, if the data erasing program 30 (deletion processing unit 38) requests directory data of the USB memory 200, the FS filter 50 does not deal with the directory data. The FS filter 50 alters, however, directory data of the USB memory read by the FS 15. Thus, different directory data of the USB memory 200 can be returned after distinction of the programs.

All or some of the operations with respect to the data erasing program 30 and the FS filter 50 loaded on the PC 100 side may be configured to be implemented via software or hardware. For example, a hardware device, system, etc. may be provided as the erasing flag obtaining unit 32, the current time obtaining unit 34, etc.

Then, a process carried out after the deletion processing unit is activated owing to S32 in FIG. 4 is explained in detail below with reference to FIG. 6.

Figure 6:
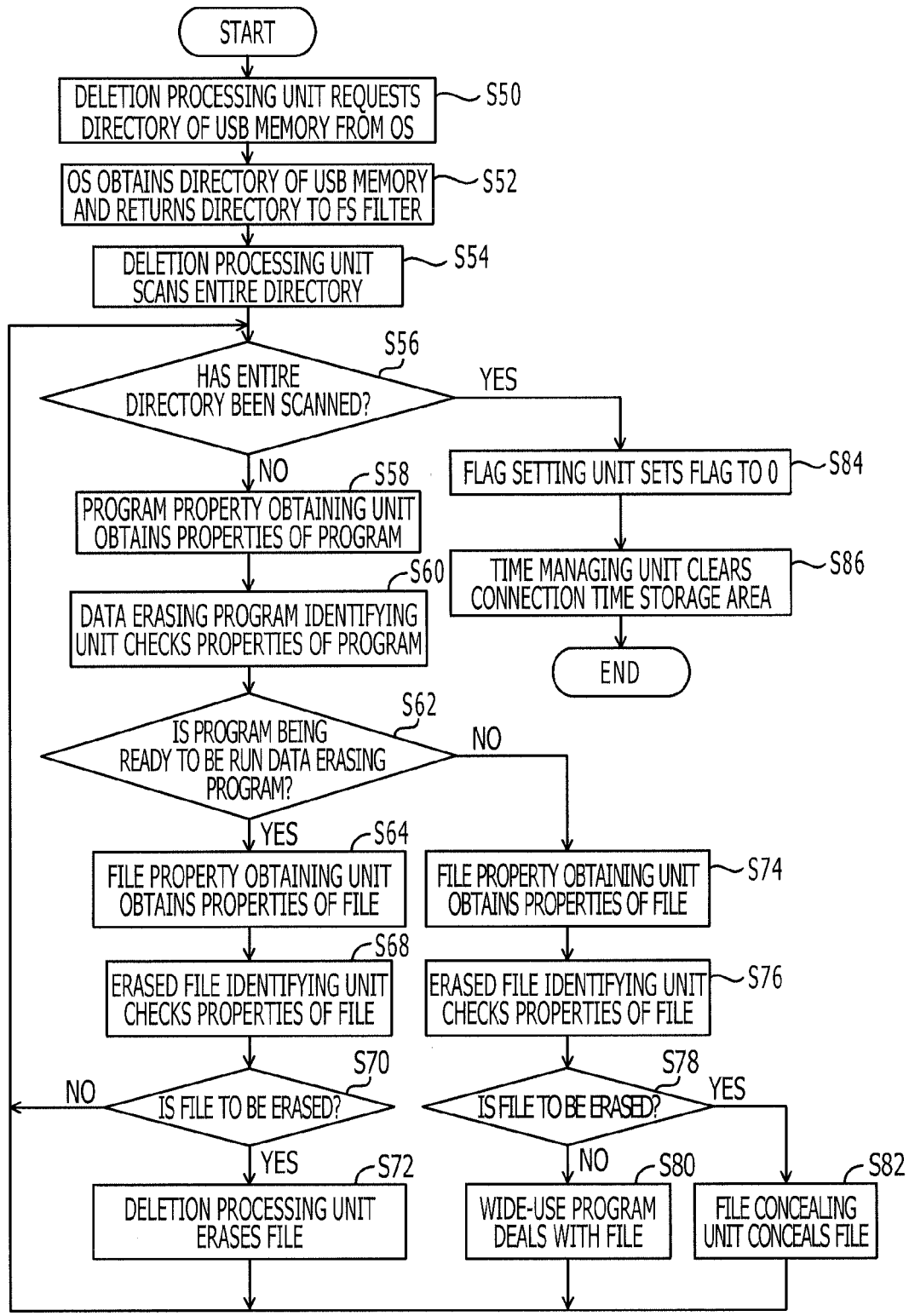
FIG. 6 is a flowchart for illustrating a process carried out after a deletion processing unit is activated in FIG. 4.

According to the process illustrated in FIG. 6, the deletion processing unit 38 requests a directory of the USB memory 200 from the OS 13 at S50. Then, the OS 13 obtains the directory of the USB memory 200 and returns the directory to the FS filter 50 at S52. FIG. 7 illustrates a directory to be returned to the FS filter 50 upon the wide-use program 11 and the data erasing program 30 requesting a directory of the USB memory 200 through the FS 15. As illustrated in FIG. 7, the directory has a data structure including various properties of files.

Then, the deletion processing unit 38 scans the entire directory at S54. Then, the deletion processing unit 38 identifies whether the entire directory has been scanned at S56. If the identification is negative here, shift to S58.

The program property obtaining unit 58 obtains properties of a program being ready to be run at S58. Properties of one of the wide-use program and the data erasing program are supposed to be obtained here.

Then, the data erasing program identifying unit 60 checks the properties of the program (the wide-use program or the data erasing program) at S60.

Then, the data erasing program identifying unit 60 identifies whether the program being ready to be run is the data erasing program or not at S62. If the identification is negative here, shift to S74. If the identification is positive here, shift to S64.

The file property obtaining unit 56 obtains properties of a file at S64. An example of the properties of a file described herewith is the last update date and time illustrated in FIG. 7. That is, the file property obtaining unit 56 obtains, for a first row of the directory illustrated in FIG. 7, the last update date and time of "one hour, zero minutes and 25 seconds pm, Nov. 2, 2009" is obtained.

Then, the erased file identifying unit 62 checks the properties of the file at S68. To put it specifically, the erased file identifying unit 62 checks whether the file is of the last update date and time prior to the current time T1. A file of the last update date and time prior to the current time T1 means that the file is to be erased. A file of the last update date and time after the current time T1 means that the file is not to be erased.

Then, the erased file identifying unit 62 identifies whether the file is to be erased at S70. If the identification is negative here, return to S56. If the identification is positive here, shift to S72. The deletion processing unit 38 erases the file at S72.

Meanwhile, if the identification is negative at S62 and the process shifts to S74, the file property obtaining unit 56 obtains the properties of the file similarly at S64. Further, the erased file identifying unit 62 checks the properties of the file (whether to be erased or not) next at S76 similarly at S68. Then, the erased file identifying unit 62 identifies whether the properties of the file are to be erased or not at S78. If the identification is negative here, the relevant file is not to be erased, and thus the wide-use program 11 deals with the relevant file. Then, return to S56.

Meanwhile, if the identification is positive at S78, i.e., the file is to be erased, the file concealing unit 64 conceals the file at S82.

Figure 8:
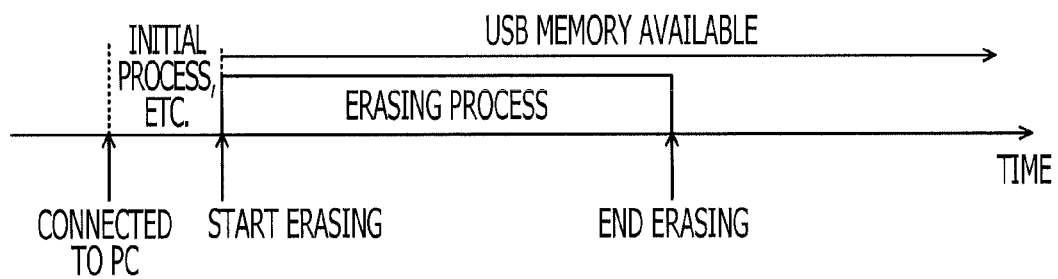
FIG. 8 illustrates how an embodiment works.

In order to deal with a file by means of the wide-use program 11 according to an embodiment, as described above, conceal the file if the file is to be erased, and carry out the file if the file is not to be erased. Further, in case of the data erasing program 30, erase the file if the file is to be erased. Thus, while the data erasing process starts after the USB memory 200 is connected to the PC 100 and after the initial process such as the auto-run, the data storage area 27 of the USB memory 200 is enabled to be used before the data erasing process finishes (substantially at the same time as the erasing process starts) as illustrated in FIG. 8.

Return to FIG. 6, and repeat the process following S56 thereafter until the entire directory is completely scanned. Then, upon the entire directory being completely scanned and the identification being positive at S56, shift to S84. As described above, all the files to be erased have been erased before the shift to S84.

The flag setting unit 42 sets the flag stored in the erasing flag storing unit 26 of the USB memory 200 to "0" at S84. Then, the time managing unit 44 clears the time T1 stored in the connection time storage area 52 at S86, so as to finish the entire process illustrated in FIG. 6. Processes are dealt with thereafter by means of the wide-use program 11 in accordance with a user's operation, etc.

According to an embodiment, as described above in detail, the PC 100 works as the erasing flag obtaining unit 32 which obtains an erasing flag ("1" or "0") to be set depending upon whether the erasing button 20 has been pushed or not, the current time obtaining unit 34 which obtains the time when the USB memory 200 is connected, the data erasing program identifying unit 60 which identifies whether the activated program is the data erasing program 30 for erasing a file stored in the USB 200 or not, and the file concealing unit 64 which conceals a file in the data stored in the USB memory 200 to be erased classified on the basis of the time when the USB memory 200 is connected upon the erasing flag being on (valued at "1") and the activated program being other than the data erasing program. A file to be erased can be concealed thereby, according to an embodiment, even if a program other than the data erasing program 30 (the wide-use program 11) tries to access the file to be erased in the USB memory 200. Thus, a file concealment feature does not suffer from a problem even if a user is enabled to access the USB memory 200 before a file to be erased is erased. The USB memory 200 is thereby enabled to be accessed while a file is being erased without affecting the file concealment feature.

Figure 9A:
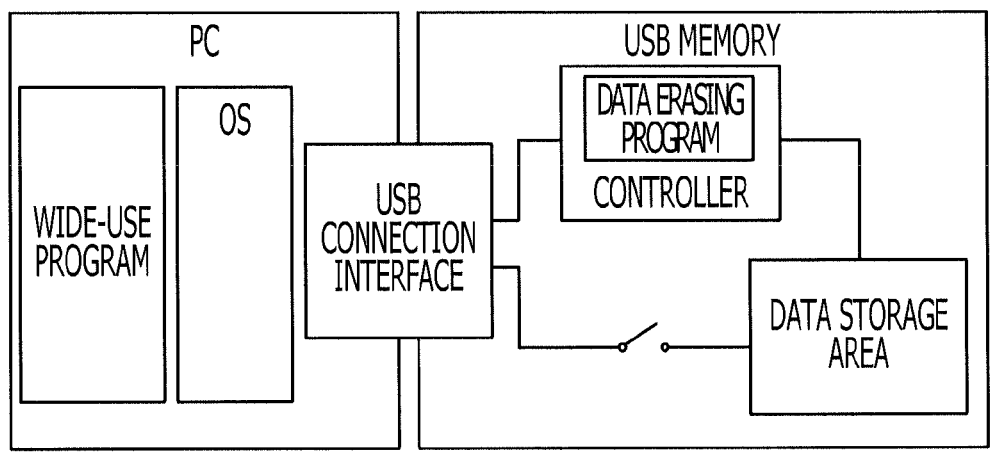
FIGS. 9A and 9B are a block diagram for illustrating a functional structure of an art related to the PC and the USB memory, and a diagram for illustrating an operation in the related art, respectively.
Figure 9B:
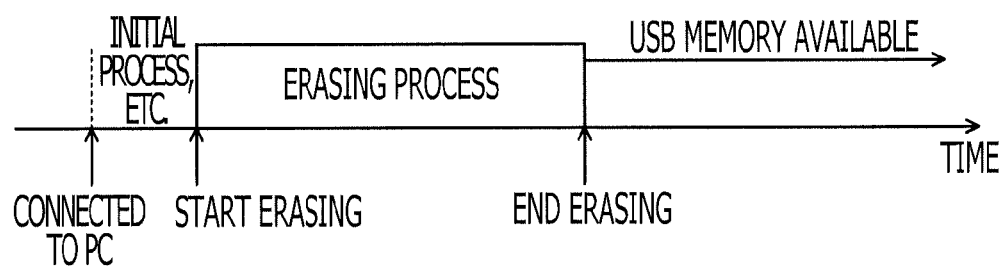

FIG. 9A is a block diagram in a case where a USB memory having a data erasing function is connected to a PC for illustrating a functional structure of an art related to the PC and the USB memory. FIG. 9A illustrates an example for which the USB memory is provided with a switch for turning on and off a connection between a USB connection interface and a data storage area, and the switch is turned off while a controller (data erasing program) is erasing a file (data) stored in the data storage area so that other files cannot be accessed from the PC side. The USB memory illustrated in FIG. 9A cannot be used while an erasing process is going on as illustrated in FIG. 9B. According to an embodiment, meanwhile, as described above, a file can be carried out by means of the wide-use program even while a data erasing operation is enabled, and the file concealing unit 64 conceals a file to be erased even if the wide-use program tries to carry out the file. Thus, an embodiment can be made more convenient to handle than the related art while maintaining the file concealment feature.

Further, as the PC 100 works as the deletion processing unit 38 which erases a file to be erased in a case where the erasing flag is on (1) and the program is the data erasing program, the file can be prevented from flowing out even in case of loss or theft of the USB memory 200.

Incidentally, as mentioned above, although the above embodiment has been explained in a case where a condition for turning the erasing flag on (1) is that the erasing button 20 is pushed, such condition is not limited to the above. The erasing flag can be turned on, e.g., if a certain period of time passes after a certain reference point of time (of previous erasing). The erasing flag can be turned on as well on the basis of another reference. In that case, the erasing button 20 can be omitted.

Incidentally, according to an embodiment, although the erased file identifying unit 62 identifies whether a file is to be erased or not depending upon whether the last update date and time is prior to the connection time of the USB memory 200, such identification is not limited to the above. The erased file identifying unit 62 can use, e.g., another date and time (e.g., the last access date and time) instead of the last update date and time. Further, the erased file identifying unit 62 can identify a file as being to be erased if the last update date and time, the gathering access date and time, etc. is prior to the connection time by a particular period of time.

Incidentally, as also mentioned above, although the above embodiment has been explained in a case where the removable storage medium is a USB memory, the removable storage medium is not limited to the above and can be another storage medium such as an SD (Secure Digital) card (registered trademark).

The method according to an embodiment enables concealing of data to be erased that is previously classified based on the connection time included in the data stored in the removable storage medium when determining that the erasing flag is set and a program of a computer with which the storage medium is connected is activated separate and independent of an erasing program. Further, an embodiment of the invention enables data to be hidden when detecting connection of a storage device with a computer while enabling access to the data in the storage device.

A program which makes a computer run the process as to the above embodiment can be stored in a computer-readable recording medium.

A computer readable storage medium that stores the aforementioned program may be a hard disk, a semiconductor memory, a CD-ROM, a USB memory, a DVD memory, or the like. A group of programs may also be transmitted through a network. However, the computer readable storage medium described in the present invention does not include a transitory transmission medium such as a propagation signal.

Accordingly, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The embodiment described above is a preferable exemplary embodiment of the invention. The embodiment is not limited to the above, though, and can be variously modified within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A computer-implemented method of a removable storage medium connected with a computer, comprising:
    obtaining an erasing flag to be set to the removable storage medium from the removable storage medium based on a predetermined rule upon determining the removable storage medium as being connected;
    obtaining a connection time when the removable storage medium is connected;
    identifying whether a program being activated on the computer is an erasing program for erasing data stored in the removable storage medium; and
    concealing data to be erased that is classified based on the connection time included in the data stored in the removable storage medium upon determining that the erasing flag is set and the program that is activated is other than the erasing program.

2. The computer-implemented method according to claim 1, wherein only the data to be erased classified based on the connection time obtained by the connection time obtaining unit is concealed in the data stored in the removable storage medium.

3. The computer-implemented method according to claim 1, comprising:
    erasing, upon determining that the erasing flag is on and the program activated is the erasing program, the data to be erased that is classified based on the connection time obtained by the connection time obtaining unit included in the data stored in the removable storage medium.

4. The computer-implemented method according to claim 1, wherein the predetermined rule used in the setting of the erasing flag is adapted for setting the erasing flag on in case of user's instructions to erase the data or upon a particular period of time having passed since a predetermined reference point of time.

5. A computer which carries out a process in relation to a removable storage medium connected with the computer, the computer comprising:
    an erasing flag obtaining unit which obtains an erasing flag to be set to the removable storage medium from the removable storage medium based on a predetermined rule upon determining the removable storage medium as being connected;
    a connection time obtaining unit which obtains a connection time when the removable storage medium is connected;
    an identifying unit which identifies whether a program being activated on the computer is an erasing program for erasing data stored in the removable storage medium; and
    a data concealing unit which conceals data to be erased that is classified based on the connection time included in the data stored in the removable storage medium upon determining that the erasing flag is set and the program that is activated is other than the erasing program.

6. The computer according to claim 5, wherein the data concealing unit conceals only the data to be erased classified based on the connection time obtained by the connection time obtaining unit in the data stored in the removable storage medium.

7. The computer according to claim 5, comprising:
    an erasing unit which erases, upon determining that the erasing flag is on and the program activated is the erasing program, the data to be erased that is classified based on the connection time obtained by the connection time obtaining unit included in the data stored in the removable storage medium.

8. The computer according to claim 5, wherein the predetermined rule used in the setting of the erasing flag is adapted for setting the erasing flag on in case of user's instructions to erase the data or upon a particular period of time having passed since a predetermined reference point of time.

9. A computer-readable storage medium that stores a program for causing a computer to perform a process in relation to a removable storage medium connected with a computer, the process comprising:
    obtaining an erasing flag to be set to the removable storage medium from the removable storage medium based on a predetermined rule upon determining the removable storage medium as being connected;

obtaining a connection time when the removable storage medium is connected;

identifying whether a program being activated on the computer is an erasing program for erasing data stored in the removable storage medium; and concealing data to be erased that is classified based on the connection time included in the data stored in the removable storage medium upon determining that the erasing flag is set and the program that is activated is other than the erasing program.

10. The computer-readable storage medium according to claim 9, wherein only the data to be erased that is classified based on the connection time obtained by the connection time obtaining unit is concealed in the data stored in the removable storage medium.

11. The computer-readable storage medium according to claim 9, comprising:

erasing, upon determining that the erasing flag is on and the program activated is the erasing program, the data to be erased that is classified based on the connection time obtained by the connection time obtaining unit included in the data stored in the removable storage medium.

12. The computer-readable storage medium according to claim 9, wherein the predetermined rule used in the setting of the erasing flag is adapted for setting the erasing flag on in case of user's instructions to erase the data or upon a particular period of time having passed since a predetermined reference point of time.

* * * * *